Patented June 17, 1924.

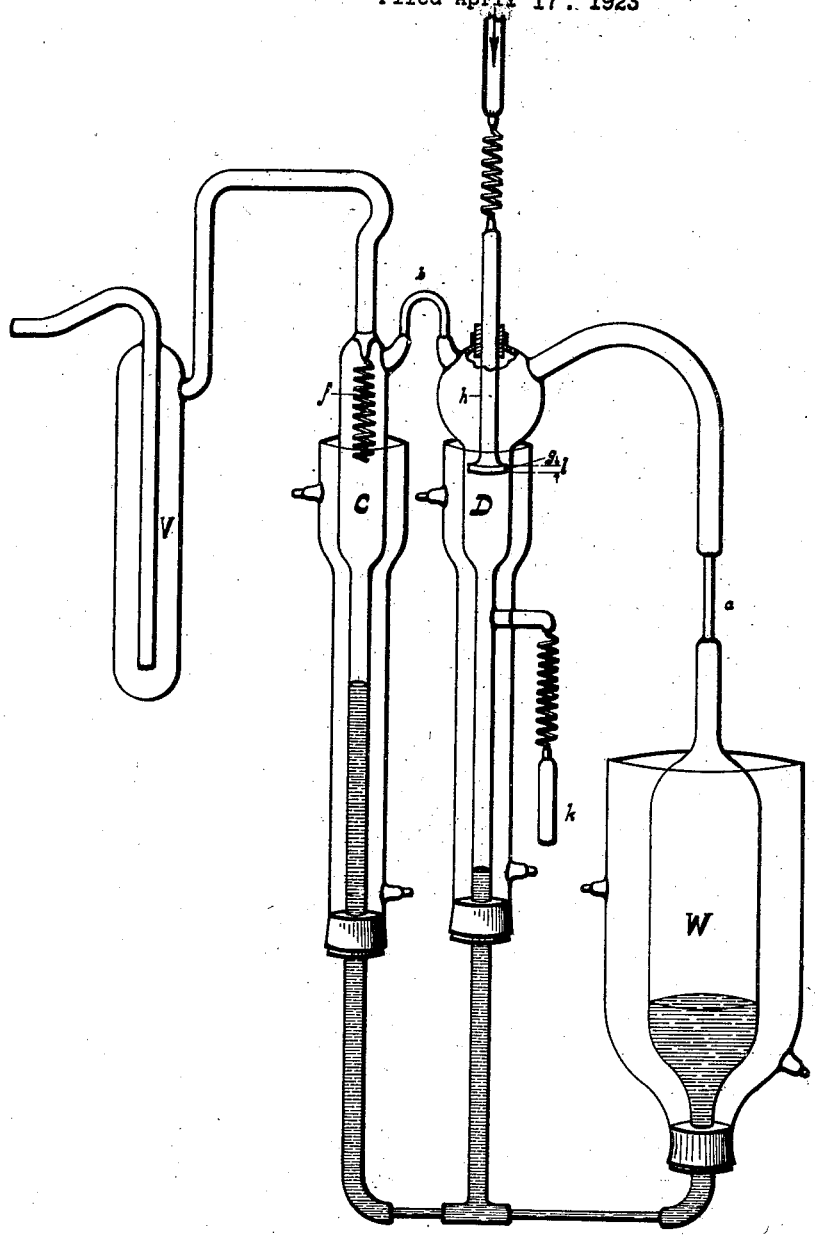

1,498,097

UNITED STATES PATENT OFFICE.

GUSTAV LUDWIG HERTZ, OF EINDHOVEN, NETHERLANDS, ASSIGNOR TO NAAMLOOZE VENNOOTSCHAP PHILIPS' GLOEILAMPENFABRIEKEN, OF EINDHOVEN, NETHERLANDS.

APPARATUS FOR SEPARATING GASES FROM A MIXTURE THEREOF.

Application filed April 17, 1923. Serial No. 632,797.

*To all whom it may concern:*

Be it known that I, Dr. GUSTAV LUDWIG HERTZ, a subject of the Republic of Germany, residing at Eindhoven, in the Province of North Brabant, in the Kingdom of the Netherlands, have invented certain new and useful Improvements in or Relating to an Apparatus for Separating Gases from a Mixture Thereof, of which the following is a specification.

This invention relates to an apparatus for separating gases from a mixture thereof.

It is known that gases can be separated from a gas mixture by passing the gases through a suitable screen or through capillary means. The apparatus for separating gases according to this invention is based on the appliance of an entirely new principle.

According to the latter a gas mixture is made to diffuse into a gaseous fluid flowing with a predetermined velocity. Preferably the velocity of the gaseous fluid will be regulable and the nature of this fluid will be such that it can be separated from the gas to be isolated or from each of the gases to be isolated. Owing to the different diffusion-coefficients of the different components of the gas mixture the concentration of each of these components in the current of auxiliary gas will have quite a different course. There will be points where the concentration of a certain component, which for instance is most diffusible of all, is relatively high with regard to the concentration of the other less diffusible components.

When removing the gas fraction at such a point a mixture of the flowing gaseous fluid with said component may be obtained in an almost pure condition. By then separating the auxiliary gas from said fraction by a condensation process or a chemical process or in any other suitable manner, the component separated from the primary gas mixture is obtained in an almost pure condition.

In other points of the current of gaseous fluid, the concentration of a second gas component will have increased, which permits of leading away from this point a gas mixture, enriched in the latter component.

The exact course of the method depends on (1) the velocity of the current along that portion of the path where the diffusing process principally takes place (this path may be referred to as the "diffusion path"), and (2) the length of this path and (3) the angle made by the latter with the direction of the current of the gaseous fluid.

The current velocity to be chosen of the gaseous fluid depends on the composition of the gas mixture and on the desired results. In order to obtain the maximum output it is advisable to design the apparatus so that it permits of working with the maximum current velocity of the auxiliary gas. In the case of diffusion taking place against the flow of gas, this implies as short a diffusion path as possible.

The apparatus according to the invention may contain a vessel, connected to inlet- and outlet-devices for the stream of gaseous fluid, for the gas mixture to be separated and for the gases which have diffused apart from each other, while moreover an arrangement can be provided for separating the streaming gaseous fluid from the components of the gas mixture. In addition the apparatus may be provided with means for adjusting the current velocity or the length of the diffusion path or both, which like the arrangement for separating the flowing gaseous fluid from the gas components and other auxiliary arrangements, will be obvious to those skilled in the art.

By arranging the inlet- and outlet-tubes in relation to each other in such a way that the gas component to be separated must diffuse against the current, it is possible to choose the conditions so that only this component is able to do so, the others on the contrary, being led astray by the current to a condenser with which the apparatus, if desired, is provided, while the component which has diffused out is led away from a point of great concentration and then liberated from the auxiliary gas.

The drawing diagrammatically represents an apparatus according to the invention and in which the gases to be separated are made to diffuse into water vapour.

Referring to the drawing the apparatus consists essentially of three parts: a water vessel W, a diffusion vessel D and a condensation vessel C, which vessels may be in communication as indicated in the drawing. The three vessels W, D and C are surrounded by water-jackets by means of which their temperature may be exactly adjusted. The temperature in W should be higher than in D and C. The vapour which is developed in W flows through a capillary $a$ into the upper spherical part of D at a current velocity which is dependent on the temperature in W. The temperatures in D and C are regulated so that a portion of the vapour is condensed in D and a portion in C. In D an inverted funnel-shaped tube $h$ is so opened out that between the wall of the funnel and the wall of D a narrow space $g$ of length $l$ remains, through which space the vapour will flow. The path $l$ is that which has been termed the diffusion path. By making the tube $h$ slidable in a vertical direction the length of the diffusion path may be varied within certain limits.

Now a gas mixture of which the total pressure is not greater than the vapour pressure of the water in W, on entering through said tube $h$ in the vessel D will partly diffuse against the stream of water vapour, and so arrive in the upper part of D and with the water vapour which is flowing through a tube $b$, also in C. The composition of this part depends on the diffusion constants of the components of the mixture. Leading therefore through $h$ a mixture of two gases with different diffusion constants, for instance a mixture of helium and neon, and choosing properly the velocity of the water vapour, only the gas with the greater diffusion-constant (helium) will be able to diffuse against the water vapour, whereas the neon stays almost wholly behind. By these means an almost complete separation of the gases can be effected. The helium which has arrived in C, flows with a portion of the water vapour through a very narrow capillary $f$ into an exhausted space V, where the water vapour may be frozen, for instance by means of liquid air, and after that into a vessel, where the separated gas is collected in an almost pure condition. The capillary serves to afford the required resistance to the current which, in consequence of the great difference of pressure in C and V, would otherwise obtain too great a velocity and thus unfavourably influence the diffusion process. The other component (neon) may be led away by means of a separate outlet-tube $k$ and separated from the water vapour in the same manner as the first component. The inlet-tube $h$ and the outlet-tube $k$ are likewise provided with capillaries. If the component separated near $k$ appears to be insufficiently pure, it may be caused to flow once more through $h$ by the aid of a circulation-device and subjected to the diffusion-process until said component has obtained the desired purity.

The whole apparatus with exception of the vessel V is placed in an enclosure, in which the temperature is kept somewhat higher than in the water vessel.

The form and the relative position of the different parts of the apparatus may be varied in numerous ways, and also the method of regulating the current velocity or the length of the diffusion path. It is not necessary that the current of auxiliary gas and the instreaming gas mixture should meet each other in the manner described above. Thus it is not necessary that one of the components should diffuse against the stream of auxiliary gas forming an angle of 180° therewith for with much smaller angles very favourable results may also be obtained. Neither it is essential that the diffusion path should have the form of a narrow slit. It should even be possible to allow the diffusion to take place in the wall of a porous body.

Instead of water vapour any other suitable gaseous fluid can be used provided that it can be separated from the gases to be collected.

In many cases it will be desirable or necessary to place several apparatus in a cascade-like series in order to collect the desired gas at the end of the series in a sufficiently pure condition.

It is remarked that the method for separating gases from a mixture by diffusion is described in my co-pending application Serial Number 632,798, filed April 17, 1923.

What I claim is:

1. Apparatus for separating the components of a gas mixture comprising in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas-components to be collected is relatively higher than that of the other components.

2. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas-components to be collected is relatively higher than that of the other components, and means for separating the streaming gaseous fluid from the collected components beyond the place where the diffusion has taken place.

3. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas components to be collected is relatively higher than that of the other components and means for regulating the current velocity of the streaming gaseous fluid.

4. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas components to be collected is relatively higher than that of the other components, and means for regulating the length of the diffusion path.

5. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas components to be collected is relatively higher than that of the other components, means for regulating the current velocity of the streaming fluid and means for regulating the length of the diffusion path.

6. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas components to be collected is relatively higher than that of the other components means for separating the streaming gaseous fluid from the collected components beyond the place where diffusion has taken place and means for regulating the current velocity of the streaming gaseous fluid.

7. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas components to be collected is relatively higher than that of the other components, means for separating the streaming gaseous fluid from the collected components beyond the place where the diffusion has taken place and means for regulating the length of the diffusion path.

8. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas components to be collected is relatively higher than that of the other components means for separating the streaming gaseous fluid from the collected components beyond the place where diffusion has taken place means for regulating the current velocity of the streaming gaseous fluid and means for regulating the length of the diffusion path.

9. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas components to be collected is relatively higher than that of the other components, the feeding- and outlet-devices being arranged in such relative position that at least one of the gas components to be collected must diffuse against the stream of gaseous fluid.

10. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas components to be collected is relatively higher than that of the other components, the feeding- and outlet-devices being arranged in such relative position that at least one of the gas components to be collected must diffuse against the stream of gaseous fluid and means for separating the streaming gaseous fluid from the collecting components beyond the place where the diffusion has taken place.

11. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas components to be collected is relatively higher than that of the other components, the feeding- and outlet-devices being arranged in such relative position that at least one of the gas components to be collected must diffuse against the stream of gaseous fluid and means for regulating the current velocity of the streaming gaseous fluid.

12. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas components to be collected is relatively higher than that of the other components, the feeding- and outlet-devices being arranged in such relative position that at least one of the gas components to be collected must diffuse against the stream of gaseous fluid means for separating the streaming gaseous fluid from the collected components beyond the place where the diffusion has taken place and means for regulating the current velocity of the streaming gaseous fluid.

13. In an apparatus for separating the components of a gas mixture in combination a vessel, devices for feeding a streaming gaseous fluid to said vessel, devices for feeding a gas mixture to be diffused to said vessel, outlet devices comprising outlet paths to conduct the gases diffused away from each other, the outlet paths beginning at places where the concentration of the gas components to be collected is relatively higher than that of the other components, the feeding- and outlet-devices being arranged in such relative position that at least one of the gas components to be collected must diffuse against the stream of gaseous fluid, means for separating the streaming gaseous fluid from the collected components beyond the place where the diffusion has taken place, means for regulating the current velocity of the streaming gaseous fluid and means for a diffusion path for said mixture as short as is practically possible.

In testimony whereof I affix my signature.

Dr. GUSTAV LUDWIG HERTZ.